United States Patent
Lee

(10) Patent No.: US 8,786,715 B2
(45) Date of Patent: Jul. 22, 2014

(54) DIGITAL CAMERA FOR COORDINATING FOCUSING WITH COMPENSATION OF CAMERA SHAKE

(75) Inventor: Jin-gi Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 556 days.

(21) Appl. No.: 12/623,581

(22) Filed: Nov. 23, 2009

(65) Prior Publication Data

US 2010/0128133 A1   May 27, 2010

(30) Foreign Application Priority Data

Nov. 26, 2008   (KR) ................. 10-2008-0118368

(51) Int. Cl.
*H04N 5/228* (2006.01)
*H04N 5/225* (2006.01)

(52) U.S. Cl.
USPC ............. 348/208.12; 348/208.4; 348/220.1

(58) Field of Classification Search
CPC .......... H04N 5/23248; H04N 5/23287; H04N 5/23258; H04N 5/772
USPC ............................. 348/208.12, 208.4, 220.1
See application file for complete search history.

(56) References Cited

U.S. PATENT DOCUMENTS

| | | | | |
|---|---|---|---|---|
| 5,835,798 A | * | 11/1998 | Kitagawa | 396/55 |
| 7,830,445 B2 | * | 11/2010 | Kawahara | 348/345 |
| 7,932,925 B2 | * | 4/2011 | Inbar et al. | 348/208.2 |
| 7,973,855 B2 | * | 7/2011 | Shirono | 348/374 |
| 2006/0176373 A1 | * | 8/2006 | Ito et al. | 348/208.12 |
| 2006/0272328 A1 | * | 12/2006 | Hara et al. | 60/527 |
| 2008/0012945 A1 | * | 1/2008 | Uenaka | 348/208.2 |
| 2008/0211922 A1 | * | 9/2008 | Murashima et al. | 348/208.99 |

* cited by examiner

*Primary Examiner* — Twyler Haskins
*Assistant Examiner* — Quang Le
(74) *Attorney, Agent, or Firm* — Drinker Biddle & Reath LLP

(57) ABSTRACT

In various embodiments, a digital camera may coordinate focusing with compensation of camera shake. The digital camera may include a shutter-signal generating unit which outputs a first shutter signal corresponding to a start of a focusing operation and a second shutter signal corresponding to a start of a photographing operation. The digital camera may also include a digital signal processor which performs a centering operation of a compensation lens in response to the first shutter signal, and which performs a compensation operation of the compensation lens for compensating for a camera shake in response to the second shutter signal.

14 Claims, 5 Drawing Sheets

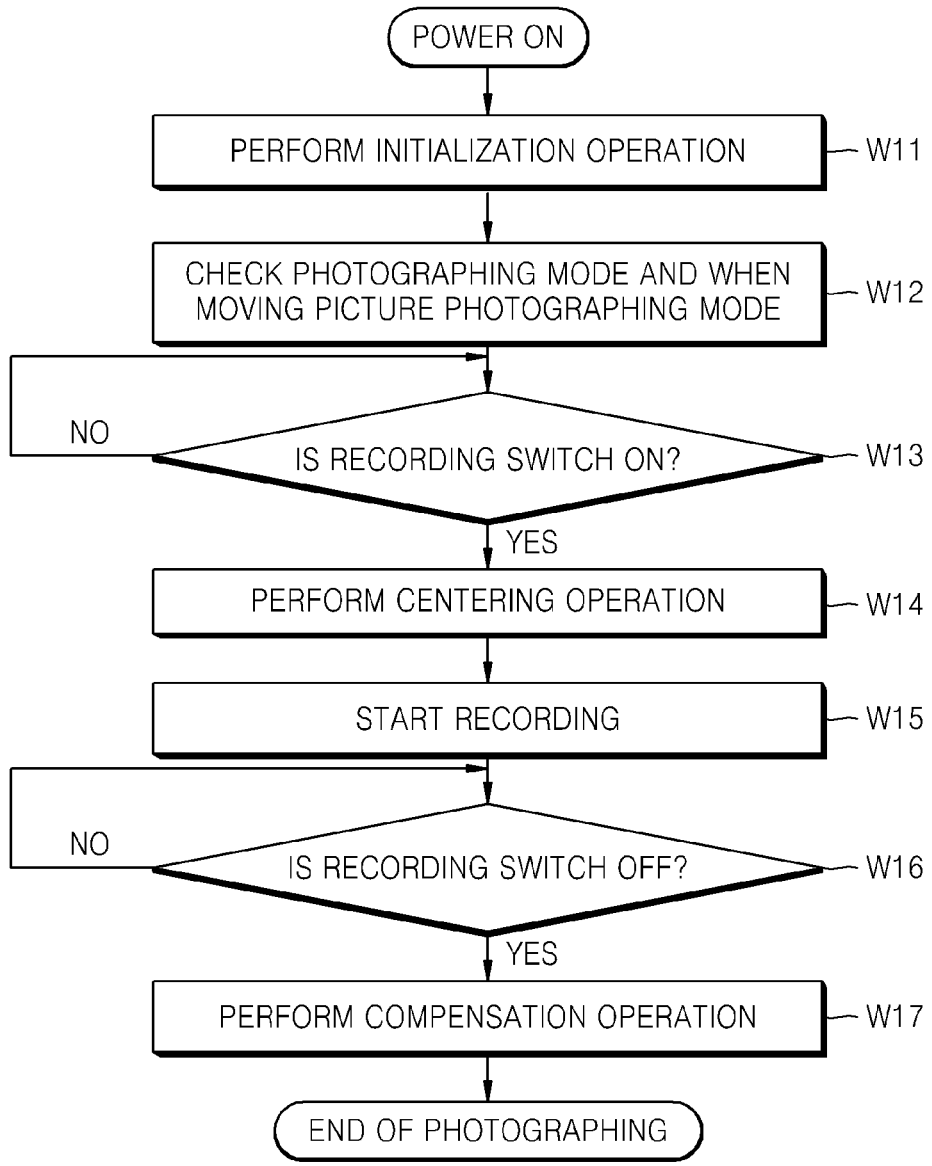

DIGITAL CAMERA FOR COORDINATING FOCUSING WITH COMPENSATION OF CAMERA SHAKE

CROSS-REFERENCE TO RELATED PATENT APPLICATION

This application claims the priority benefit of Korean Patent Application No. 10-2008-0118368, filed on Nov. 26, 2008, in the Korean Intellectual Property Office, the disclosure of which is incorporated herein in its entirety by reference.

BACKGROUND

1. Field of the Invention

The present invention relates to a digital camera and a method of controlling the same, and more particularly, to a digital camera for coordinating focusing with compensation of camera shake.

2. Description of the Related Art

Generally, a digital camera is an apparatus that captures an image of an object, creates an image data corresponding to the image, and records the image data as an image file. When a camera shake due to a tremble of a photographer's hands or surrounding vibrations is reflected on a captured image, a deteriorated image such as a blurred image may result. Conventionally, a camera may be mounted on a supporter such as a tripod so as to stabilize the camera before an image is captured. However, in recent times, as digital cameras are inclined to be compact and slim as a result of technological development and mobile devices such as cellular phones include the functions of a camera or a camcorder, mobile devices are typically used to take a picture without a separate supporter. Accordingly, various technologies of image stabilization have been developed to automatically compensate for the camera shake (e.g., hand tremble). For example, an optical method of controlling a compensation lens to appropriately compensate for a movement corresponding to the camera shake and an electronic method of controlling an image sensor instead of the compensation lens to appropriately compensate for a movement corresponding to the camera shake have been studied and developed.

Typically, when a focusing operation is performed using a conventional camera having a device for compensating for the camera shake (hereinafter referred to as 'hand-tremble compensation device'), there is no specific method of controlling the hand-tremble compensation device so as to perform a stabilized focusing operation. Therefore, according to a mechanical structure or the control performance of the hand-tremble compensation device, a focusing error or time delay in focusing may occur.

SUMMARY

In various embodiments, a digital camera includes a function of stabilizing an image by compensating for a hand tremble, and may prevent time delay in focusing and a focusing error due to a compensation operation of compensating for the hand tremble.

In an embodiment, a digital camera includes a shutter-signal generating unit which outputs a first shutter signal corresponding to a start of a focusing operation and a second shutter signal corresponding to a start of a photographing operation, and a digital signal processor which performs a centering operation of a compensation lens in response to the first shutter signal, and which performs a compensation operation of the compensation lens for compensating for a camera shake in response to the second shutter signal.

In the centering operation, the compensation lens may be driven using a constant direct current (DC) signal. The DC signal may include a bias voltage for coinciding an optical axis of the compensation lens with an optical axis of incident light.

In addition, in the centering operation, servo-control may be performed so that the compensation lens maintains a centered position. The servo-control may be performed according to any one method selected from the group consisting of a voltage driving method using a driving voltage as a variable, and a pulse width driving method using an on-time of a driving pulse as a variable, according to a driving waveform of the compensation lens.

In the compensation operation, a target position for offsetting a detected camera shake may be calculated, and the compensation lens may be controlled to trace the target position.

The digital camera may further include a gyro sensor which detects a camera shake, and a Hall sensor which detects a present position of the compensation lens.

In another embodiment, a digital camera includes a shutter signal generating unit which outputs a first shutter signal corresponding to a start of a focusing operation, and which outputs a second shutter signal corresponding to a start of a photographing operation. The embodiment of the digital camera also includes a digital signal processor which performs a centering operation of an image sensor in response to the first shutter signal, and which performs a compensation operation of the image sensor for compensating for a camera shake in response to the second shutter signal.

In the centering operation, the image sensor may be driven using a constant direct current (DC) signal. The DC signal may include a bias voltage for coinciding an optical axis of the image sensor with an optical axis of incident light.

In addition, in the centering operation, servo-control may be performed so that the image sensor maintains a centered position.

In the compensation operation, a target position for offsetting a detected camera shake may be calculated, and the image sensor may be controlled to trace the target position.

A method of controlling a digital camera having a hand-tremble compensation element may include detecting a first shutter signal corresponding to a start of a focusing operation, performing a centering operation of the hand-tremble compensation element in response to the first shutter signal, detecting a second shutter signal corresponding to a start of a photographing operation, and performing a compensation operation of the hand-tremble compensation element in response to the second shutter signal.

The hand-tremble compensation element may include a compensation lens or an image sensor.

In the performing of the centering operation, the hand-tremble compensation element may be driven using a constant direct current (DC) signal. The DC signal may include a bias voltage for causing an optical axis of the image sensor to coincide with an optical axis of incident light.

In addition, in the performing of the centering operation, servo-control may be performed so that the hand-tremble compensation element maintains a centered position.

In the performing of the hand-tremble compensation operation, a target position for offsetting a detected camera shake may be calculated, and a position of the hand-tremble compensation element may be controlled to trace the target position.

Another method of controlling a digital camera having a hand-tremble compensation element may include detecting a recording start signal corresponding to a start of moving picture photographing, performing a centering operation of the compensation element in response to the recording start signal; detecting a recording end signal corresponding to an end of the moving picture photographing, and performing a compensation operation of the compensation element for compensating for a hand tremble in response to the recording end signal.

The compensation element may include a compensation lens or an image sensor.

In the performing of the centering operation, the compensation element may be driven using a constant direct current (DC) signal. The DC signal may include a bias voltage for coinciding an optical axis of the compensation element with an optical axis of incident light.

In the performing of the compensation operation, a target position for offsetting a detected camera shake may be calculated, and the compensation element may be controlled to trace the target position.

BRIEF DESCRIPTION OF THE DRAWINGS

The above and other features and advantages of the present invention will become more apparent by describing in detail exemplary embodiments thereof with reference to the attached drawings listed below:

FIG. 5 is a flowchart for describing another exemplary method of controlling a digital camera, performed during moving picture photographing.

DETAILED DESCRIPTION

Exemplary embodiments will be described in detail with reference to the attached drawings. A digital camera may include a mobile apparatus that is designed to be mobile, and has a proper photographing function. In addition, the term digital camera may be used broadly include mobile apparatuses, such as camcorders, mobile phones, and personal digital assistants that feature both portability and a photographing function, as well as other digital cameras that are classified as such depending upon their configuration.

Figure 1:
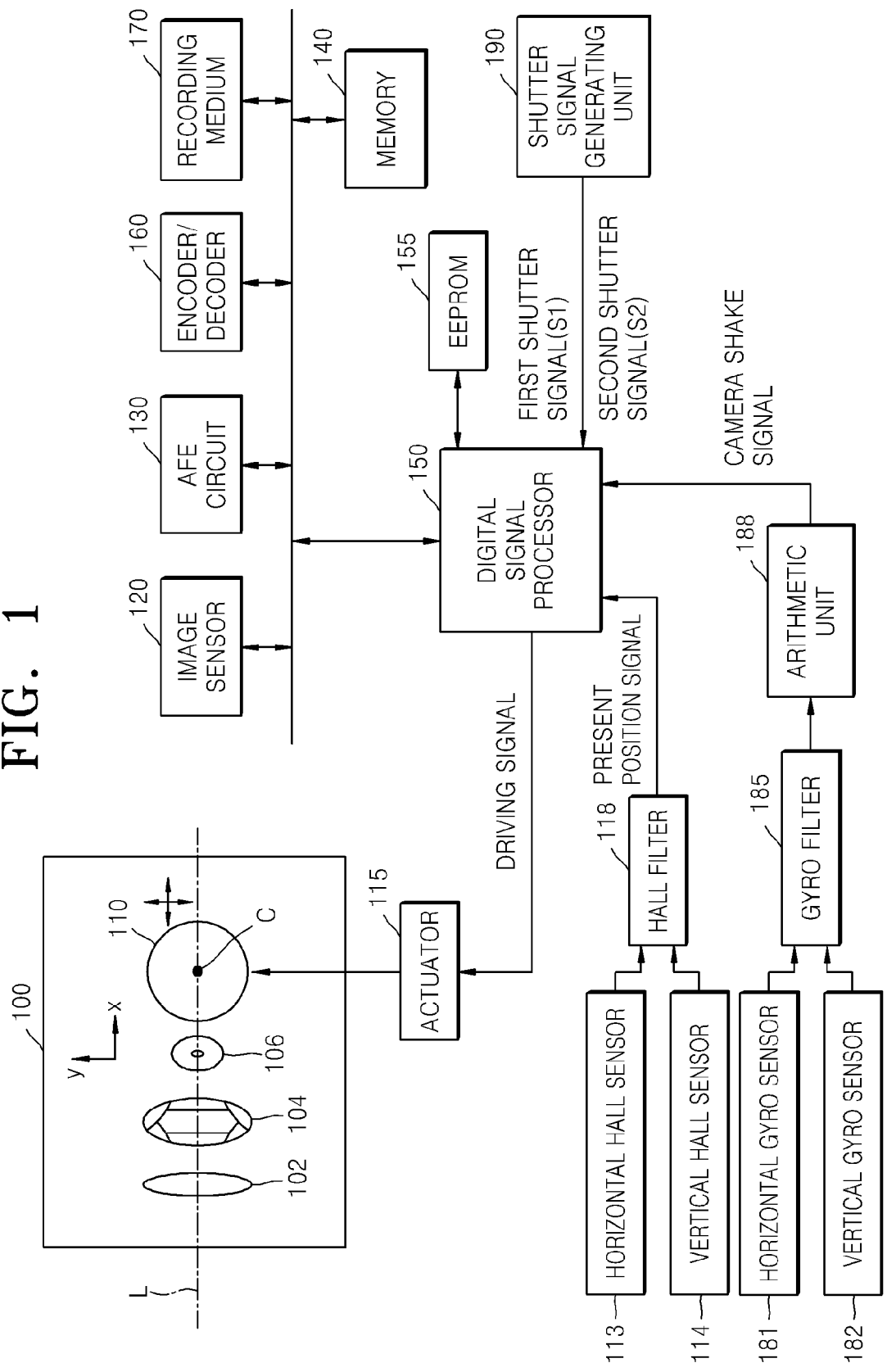
FIG. 1 is a block diagram illustrating an overall structure of an exemplary digital camera.

FIG. 1 is a block diagram illustrating an overall structure of an exemplary digital camera. The digital camera may have a function of stabilizing an image by compensating for a hand tremble, and be capable of preventing time delay in focusing and a focusing error due to a hand-tremble compensation operation. An optical unit 100 may include a plurality of optical lenses which form an image of an object on an image sensing surface of an image sensor 120. The image sensor 120 may convert the image of the object which passes through the optical unit 100 into electrical image signals. An analog front end (AFE) circuit 130 may process the electrical image signals output from the image sensor 120 and convert the electrical image signals into quantized digital image signals. A memory 140 may temporarily store the digital image signals so as to provide a processing area for image processing. A recording medium 170 may store image data of the object as a still image file or a moving picture file. A digital signal processor 150 may generally control overall data flow and each of the constituting elements of the digital camera.

The optical unit 100 may include a zoom lens 102 which moves back and forth along the direction of an optical axis L to change a focal distance, a shutter 104 and an iris diaphragm 106 which adjust an exposure time and an amount of incident light of the image sensor 120, and a focusing lens 110 which adjusts a focal point of the object image formed on the image sensor 120. The focusing lens 110 may function as a compensation lens that moves on a plane (e.g., x-y plane) perpendicular to the optical axis L so as to compensate for an image shake (e.g., camera shake) occurring due to a hand tremble and fixes an image forming position of the object. Hereinafter, the focusing lens 110 is consistently referred to as the compensation lens 110. In addition, the technical features of the present invention may be applied, in the same manner, to an optical structure that includes a focusing lens and a separate compensation lens.

The image sensor 120 may include, for example, a charge-coupled device (CCD) or complementary metal-oxide semiconductor (CMOS) image sensor, and may convert an incident object image passing through the optical unit 100 into electrical image signals. The image sensor 120 may include a main device for compensating for the hand tremble. Instead of the compensation lens 110 moving, the main device of the image sensor 120 for compensating for the hand tremble may move on the plane (e.g., x-y plane) perpendicular to the optical axis L so as to trace an image forming position of an object that is moved by the hand tremble and to fix the image forming position. In the following, the compensation lens 110 is explained as an example of a main device for compensating for the hand tremble, for convenience of description. In addition, all the technological features regarding a compensation process can be applied, in the same manner, to the image sensor 120.

The AFE circuit 130 may perform a correlated double sampling (CDS) process and an analog digital conversion (ADC) process on the output signals of the image sensor 120 to convert the analog image signals output from the image sensor 120 into the quantized digital image signals. The quantized digital image signals may be transferred to an encoder/decoder 160, converted into coded data according to a predetermined compression method, and stored in the recording medium 170. The memory 140 may include a dynamic random access memory (DRAM) or a synchronous dynamic random access memory (SDRAM) that provides a process area for processing data of the encoder/decoder 160 and the digital signal processor 150.

The digital signal processor 150 may execute programs recorded in an electrically erasable and programmable read-only memory (EEPROM) 155, and may generally control each of the constituting elements of the digital camera. In particular, the digital signal processor 150 may perform an operation of compensating for the hand tremble and stabilizing an image. Hereinafter, the operation is referred to as 'compensation operation'. That is, the digital signal processor 150 may notice the amount of a shake output from gyro sensors 181 and 182, calculate a target position of the compensation lens 110 to offset the captured shake, compare the target position with the present position of the compensation lens 110 output from Hall sensors 113 and 114, and, according to the comparison result, output a driving signal corresponding to a difference in positions to an actuator 115.

The gyro sensor 181 may include a horizontal gyro sensor that measures an angular velocity of the digital camera with respect to a horizontal axis (x-axis). The gyro sensor 182 may include a vertical gyro sensor that measures an angular velocity of the digital camera with respect to a vertical axis (y-axis). A gyro filter 185 that includes a selection characteristic with respect to a specific frequency band may be disposed on the output side of the gyro sensors 181 and 182. The gyro filter 185 may allow desired frequency components to pass through. An arithmetic unit 188 disposed after the gyro filter 185 may calculate an amount of camera shake by a proper integration process using output from the gyro filter 185.

The Hall sensor 113 may include a horizontal Hall sensor that detects a coordinate value of the horizontal axis (x-axis) corresponding to the present position of the compensation lens 110. The Hall sensor 114 may include a vertical Hall sensor that detects a coordinate value of the vertical axis (y-axis) corresponding to the present position of the compensation lens 110. A coordinate signal of the present position of the compensation lens 110 output from the Hall sensors 113 and 114 may be transferred to the digital signal processor 150 via a proper Hall filter 118 that removes noise components and allows desired frequency components to pass through.

The actuator 115 may receive a driving signal controlled by and output from the digital signal processor 150 in order to move the compensation lens 110 to a target position. The actuator 115 may include a voice coil motor (VCM) composed of a pair of a driving coil (not shown) and a magnet (not shown), that act electromagnetic attractions on each other along the horizontal axis (x-axis) and the vertical axis (y-axis). In addition, the actuator 115 may include a direct current (DC) motor or a step motor.

In addition, the digital camera may include a shutter-signal generating unit 190. The shutter-signal generating unit 190 may include a shutter release button that outputs an electrical signal representing a start of photographing. Further, in the case that the shutter-signal generating unit 190 includes a two-stage shutter release button, the shutter-signal generating unit 190 may generates a first shutter signal S1 when the shutter release button is half-pressed, and generate a second shutter signal S2 when the shutter release button is fully pressed. In response to the first shutter signal S1, an automatic-focusing operation (auto-focusing operation) of focusing the focus on an object and an automatic-exposure operation (auto-exposure operation) of controlling an exposure time may be started, and according to the second shutter signal S2, a photographing operation may be started with the determined focus distance and exposure time.

The digital signal processor 150 may perform a centering operation so that the optical center C of the compensation lens 110 coincides with the optical axis L of incident light, or perform a compensation operation for a camera shake, according to whether the first shutter signal S1 or the second shutter signal S2 has been generated. Since the centering operation for the compensation lens 110 and the compensation operation are performed to control the same compensation lens 110 to trace different target positions and are thus exclusive operations, the centering operation for the compensation lens 110 and the compensation operation may not be performed at the same time and therefore the centering operation may be performed in response to the first shutter signal S1 and the compensation operation may be performed in response to the second shutter signal S2, separately.

To elaborate in detail, when the first shutter signal S1 is generated, the digital signal processor 150 may perform the centering operation that maintains the compensation lens 110 at a centered position and may not perform the compensation operation that moves an image forming position in order to compensate for the hand tremble. This is intended for a focal point to not deviate from a true focal point due to the compensation operation of moving the image forming position since the auto-focusing operation that focuses an image of an object is performed in response to the first shutter signal S1. For example, the digital camera may continuously capture the image while making the compensation lens 110 move back and forth along the optical axis L, and determine when auto-focusing data of instantaneously captured image data reaches the most favorable value. For example, when relative contrast values of some pixels as compared to those of the same pixels of the previously captured image reach the highest value, the position of the compensation lens 110 may be in an in-focus position.

If the compensation operation that changes the image forming position is performed during an auto-focusing operation, exact auto-focused data may not be obtained, and therefore an error in the in-focus position may occur. Further, an auto-focusing operation may be performed again since a change in a position of the compensation lens 110 may be recognized as a change in a focal point although the image has been focused already, and therefore unnecessary operations may be repeated and a focusing time delay may occur. Thus, in response to the first shutter signal S1 for performing the focusing operation, the centering operation in which the optical center C coincides with the optical axis L of incident light is performed, and while the compensation lens 110 is maintained at a centered position, the focusing operation can be performed stably.

In the centering operation, the compensation lens 110 may be maintained at the centered position by driving the actuator 115 with a reference voltage of a constant level. The compensation lens 110 may be installed in a floated state while being supported by an elastic body (not shown) interposed between the compensation lens 110 and a lens adapter housing, and a PC bias voltage may be applied in order to maintain the compensation lens 110 at the centered position in spite of physical binding forces such as the weight of the compensation lens 110 itself and the elastic force of the elastic body. The reference voltage refers to the bias voltage that may be constantly maintained for centering the compensation lens 110, and may refer to a reference voltage forming a reference operation point in the compensation operation for image stabilization.

Meanwhile, in the centering operation of the compensation lens 110, besides the DC voltage driving method in which the constant bias voltage is applied to the actuator 115, a servo-control method may be employed. In the servo-control method, a servo-control may transfer the present position of the compensation lens 110 to the digital signal processor 150 in real time as feedback. The digital signal processor 150 may generate a new driving signal from an error signal corresponding to a difference between the target position (the centered position) and the present position, and drive the actuator 115 according to the new driving signal. In the servo-control method, as an embodiment of the actuator 115, the VCM driving may be accomplished according to one of a voltage control method and a pulse width control method.

Figure 2A:
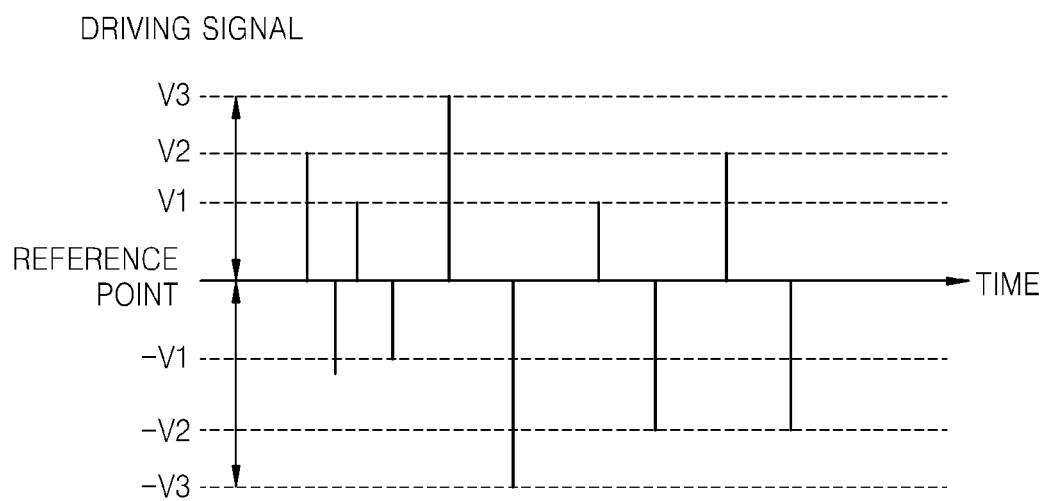
FIGS. 2A and 2B are diagrams illustrating exemplary shapes of driving signals for servo-control of a compensation lens, used in a voltage control method and a pulse width control method, respectively.
Figure 2B:
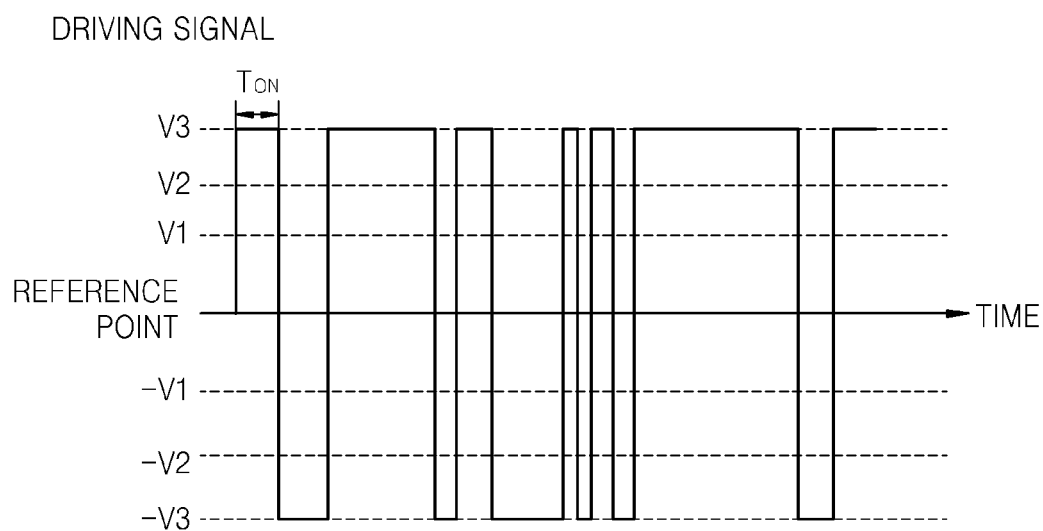

FIGS. 2A and 2B are diagrams illustrating exemplary shapes of driving signals for the servo-control of the compensation lens 110 used in the voltage control method and the pulse width control method, respectively. Referring to FIG. 2A, in the voltage control method, the driving signal may be composed of various voltage levels between voltages −V3 and V3, the various voltage levels having a positive polarity and a negative polarity, and the amount of movement of the compensation lens 110 can be controlled by changing the voltage level. Referring to FIG. 2B, in the pulse width control method, the driving signal may be composed of pulses having constant peak voltages −V3 and V3, and an output of the actuator 115 and the amount of movement of the compensation lens 110 may be controlled by adjusting a duty ratio that defines an "ON" time $T_{ON}$ during which the driving signal is applied. In the servo-control method, while the digital signal processor 150 adjusts the voltage level or the duty ratio, the position of the compensation lens 110 is made to approach the centered position, and while continuously adjusting the voltage level and the duty ratio according to a difference between the present position and the target position (the centered position) of the compensation lens 110, the digital signal processor 150 may control the position of the compensation lens 110.

Figure 3A:
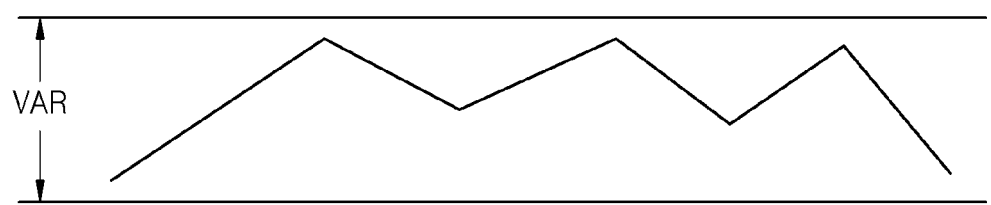
FIGS. 3A and 3B are diagrams illustrating exemplary variations in a position of a compensation lens in a servo-control driving and a direct current (DC) voltage driving method.
Figure 3B:
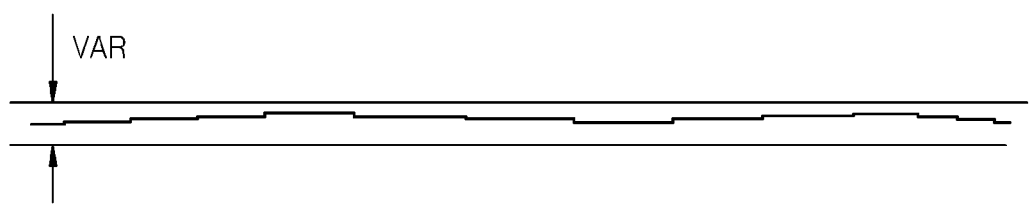

FIGS. 3A and 3B are diagrams illustrating exemplary variations in a position of a compensation lens in a servo-control driving and a DC voltage driving method. When the DC voltage control method and the servo-control method are compared to each other in the aspect of maintaining the centered position of the compensation lens 110, the DC voltage control method is much better than the servo-control method. That is, since in the servo-control method, the voltage level or the duty level is continuously adjusted according to the present position of the compensation lens 100 that varies in real time, the centered position of the compensation lens 110 may not be easily maintained, and as shown in FIG. 3A, variations in the position of the compensation lens 110 forms a waveform that vibrates and overshoots above and below the centered position, i.e., the reference position. In contrast, in the DC voltage driving method that outputs the constant bias voltage, the centered position of the compensation lens 110 may be more easily maintained, and since, as shown in FIG. 3B, vibration variations Var are reduced to about a rate of one tenth (¹/₁₀) with respect to the centered position, i.e., the reference position, the focusing operation is rapidly accomplished and a focus error can be reduced.

The centering operation of the compensation lens 110 may be performed in response to the first shutter signal S1, and the auto-focusing operation and the auto-exposure operation may be performed in a state of maintaining the centered position. Then, when the second shutter signal S2 is generated, the centering operation of the compensation lens 110 may change to the compensation operation, and a photographing of an object may begin according to the position of the focal point and the exposure time set in a previous stage. In the compensation operation, the digital signal processor 150 may refer to the amount of camera shake output from the gyro sensors 181 and 182, and calculate a target position to which the compensation lens 110 is moved in an opposite direction to offset the amount of camera shake. Then, the digital signal processor 150 may receive the present position signal outputted from the Hall sensors 113 and 114, compare the present position with the target position of the compensation lens 110, and generate a driving signal corresponding to an error or a difference between the present position and the target position of the compensation lens 110 to drive the actuator 115. As the actuator 115 is driven, the compensation lens 110 may approach the target position. The image forming position may be fixed by a series of processes of the compensation operation in spite of the camera shake, and an image capture for obtaining full data of a picture from the image sensor 120 may be performed in a stabilized image state.

In addition, an on/off state of the compensation operation may be set with respect to each of the operation steps of the digital camera by means of an optical image stabilization (OIS) mode set, and the following various OIS modes can be set.

1. OIS S1 mode: in an OIS S1 mode, the compensation operation for image stabilization may be started in response to the first shutter signal S1.
2. OIS S2 mode: in an OIS S2 mode, the compensation operation for image stabilization may be started in response to the second shutter signal S2.
3. OIS continuous mode: in an OIS continuous mode, when a camera power source begins to be in an on state, the compensation operation for image stabilization may be started immediately.

In various embodiments, in response to the first shutter signal S1 that starts the auto-focusing operation, the compensation operation may not be performed, and the centering operation in which the optical center C of the compensation lens 110 coincides with the optical axis L may be performed instead. Therefore, although the presently set OIS mode may be the S1 mode or the continuous mode that is scheduled to perform the compensation operation, priority may be given to precise focusing that is directly related to the quality of an image and the centering operation may be performed in response to the first shutter signal S1.

Figure 4:
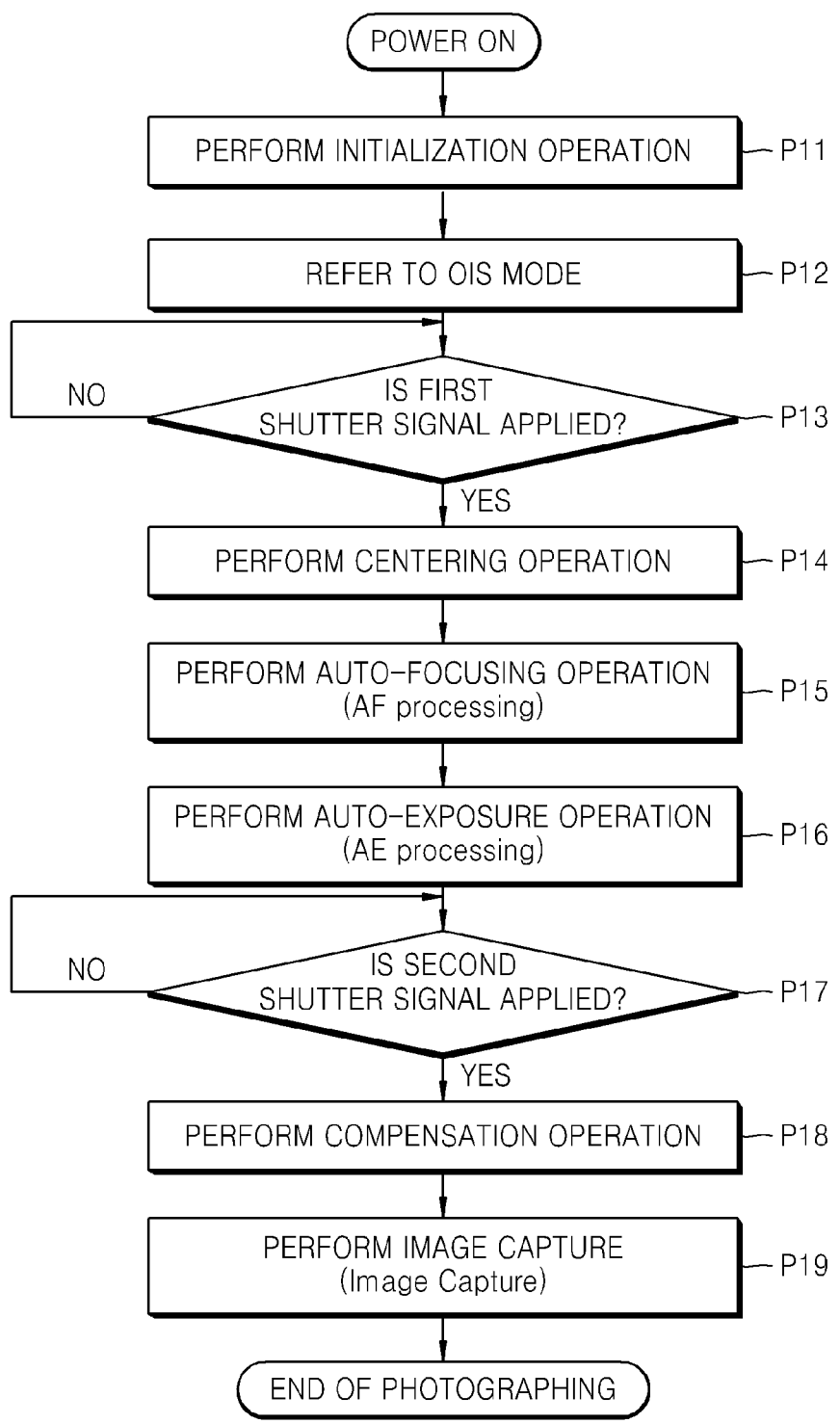
FIG. 4 is a flowchart for describing an exemplary method of controlling a digital camera.

FIG. 4 is a flowchart for describing an exemplary method of controlling a digital camera. A series of processing steps performed by the digital signal processor 150 are shown in FIG. 4, according to an embodiment. At first, when a driving voltage is applied to the digital camera, the digital signal processor 150 may perform an initialization operation (P11). For example, the digital signal processor 150 may refer to a presently set OIS mode (P12). Then, a determination is made as to whether the first shutter signal S1 is applied (P13). If the first shutter signal S1 is applied, the digital signal processor 150 may perform the centering operation of the compensation lens 110 (P14). At this time, although the OIS mode may be set to the S1 mode or the continuous mode, the digital signal processor 150 may perform the centering operation of the compensation lens 110 at the same time as the first shutter signal S1 is applied, and may not perform the compensation operation. At this time, the centered position of the compensation lens 110 may be maintained by driving the actuator 115 using, for example, DC bias voltage. Subsequently, in the state of maintaining the centered position of the compensation lens 110, the auto-focusing operation for adjusting a focal point of an object image may be performed (P15) and the auto-exposure operation for adjusting an exposure time depending on the surrounding conditions of the object may be performed (P16). Then, a determination as to whether the second shutter signal S2 is applied may be made (P17). If the second shutter signal S2 is applied, the centering operation of the compensation lens 110 may be changed to the compensation operation for image stabilization (P18). In the compensation operation, an image forming position may be constantly maintained as the compensation lens 110 is moved in the opposite direction corresponding to a camera shake so as to compensate for movement of the image forming position due to the camera shake. More concretely, the digital signal processor 150 may perform operation processes using velocity data respectively received from the gyro sensors 181 and 182 to calculate the amount of camera shake, and refer to the calculated amount of camera shake to calculate a target position of the compensation lens 110 for constantly maintaining the image forming position of the object. Subsequently, the digital signal processor 150 may receive the present position signal output from the Hall sensors 113 and 114, compare the present position with the target position of the compensation lens 110, and perform a servo-control operation to make the compensation lens 110 approach the target position. In addition, the digital signal processor 150 may start both the compensation operation for image stabilization and a photographing operation. That is, the digital signal processor 150 may start the photographing operation according to the position of the focal point and the exposure time that are determined by the auto-focusing operation and the auto-exposure operation, respectively, and perform an image capture for obtaining full image data of a picture by operating the image sensor 120 (P19).

In contrast, in moving picture photographing that simultaneously records both image data and sound/voice data, mechanical operation sound of a mechanism for compensating for the hand tremble may be recorded as noise components and may inconvenience a listener when the recorded sound is reproduced. The centering operation of the compensation lens 110 may be performed in a low noise level using a constant DC bias voltage, and the mechanical operation sound of the compensation mechanism can be minimized. Therefore, during the duration of moving picture photographing, the compensation operation may not be performed and the centering operation of the compensation lens 110 may be performed.

FIG. 5 is a flowchart for describing another exemplary method of controlling a digital camera, performed during moving picture photographing. When a driving voltage is applied to the digital camera, the digital signal processor 150 may perform an initialization operation (W11). Then, the digital signal processor 150 may check the present photographing mode and when the present photographing mode is confirmed as a moving picture photographing mode, the digital signal processor 150 may wait for switching-on of a recording switch (W12). Whether the recording switch is turned on or not may be determined until the recording switch is turned on (W13). Subsequently, the digital signal processor 150 may start the centering operation of the compensation lens 110 (W14). In the centering operation of the compensation lens 110, since the actuator 115 is driven with a constant DC bias voltage, the centered position of the compensation lens 110 can be maintained. In addition, the moving picture photographing operation may start simultaneously with the switching-on of the recording switch, and according to a constant driving clock, the image sensor 120 may be exposed to light, and image data of the amount of one frame may be obtained (W15). Whether the recording switch is turned off or not may be determined until the recording switch is turned off (W16). When the recording switch is switched off, the centering operation of the compensation lens 110 may be changed to the compensation operation (W17). The digital signal processor 150 may detect the hand tremble in the compensation operation, calculate a target position of the compensation lens 110 for offsetting the hand tremble, and generate a driving signal corresponding to a difference between the target position and the present position of the compensation lens 110 to drive the compensation lens 110.

In various embodiments, the digital signal processor 150 may detect operational steps of the digital camera and automatically change the centering operation to the compensation operation. For example, since during the auto-focusing operation that focuses on an object, the centering operation may be performed instead of the compensation operation that moves an image forming position, the auto-focusing operation can be accomplished precisely and rapidly. In addition, since the compensation operation for offsetting the hand tremble may be performed during actual photographing, image stabilization can be accomplished. Thus, the digital camera may include an image stabilization function of compensating for a photographer's hand tremble, and delay in an auto-focusing time or an error of a focal point can be prevented.

A program for executing a method of controlling a digital camera according to the aforementioned embodiments or modifications thereof may be stored in a computer-readable storage medium. The storage medium may include the EEPROM 155, memory 140, or recording medium 170, as illustrated in FIG. 1. Examples of the storage medium include magnetic storage media (e.g., floppy disks, hard disks, or magnetic tape), optical recording media (e.g., CD-ROMs or digital versatile disks (DVDs)), and electronic storage media (e.g., integrated circuits (IC's), ROM, RAM, EEPROM, or flash memory).

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. It will be recognized that the terms "comprising," "including," and "having," as used herein, are specifically intended to be read as open-ended terms of art.

What is claimed is:

1. A digital camera comprising:
a shutter-signal generating unit which outputs a first shutter signal corresponding to a start of a focusing operation, and a second shutter signal corresponding to a start of a photographing operation; and
a digital signal processor which performs a centering operation of a compensation lens in response to the first shutter signal so that the optical center of the compensation lens coincides with the central optical axis of incident light, and which performs a compensation operation of the compensation lens for compensating for a camera shake in response to the second shutter signal,
wherein the focusing operation is performed in response to the first shutter signal and after the centering operation is performed, while the compensation lens is held at a centered position, and the focusing operation is performed before the compensation operation is performed, and
wherein in the compensation operation, a target position for offsetting a detected camera shake is calculated, and the compensation lens is controlled to trace the target position.

2. The digital camera of claim 1, wherein a DC signal associated with the centering operation includes a bias voltage for coinciding the optical center of the compensation lens with the central optical axis of incident light.

3. The digital camera of claim 1, further comprising:
a gyro sensor which detects a camera shake; and
a Hall sensor which detects a present position of the compensation lens.

4. The digital camera of claim 1, wherein in the centering operation, the compensation lens is driven using a constant voltage direct current (DC) signal.

5. The digital camera of claim 1, wherein the digital signal processor further performs auto-focusing and auto-exposure in response to the first shutter signal.

6. A digital camera comprising:
   a shutter signal generating unit which outputs a first shutter signal corresponding to a start of a focusing operation, and which outputs a second shutter signal corresponding to a start of a photographing operation; and
   a digital signal processor which performs a centering operation of an image sensor in response to the first shutter signal so that the optical center of the image sensor coincides with the central optical axis of incident light, and which performs a compensation operation of the image sensor for compensating for a camera shake in response to the second shutter signal,
   wherein the focusing operation is performed in response to the first shutter signal and after the centering operation is performed, while the compensation lens is held at a centered position, and the focusing operation is performed before the compensation operation is performed, and
   wherein in the compensation operation, a target position for offsetting a detected camera shake is calculated, and the image sensor is controlled to trace the target position.

7. The digital camera of claim 6, wherein a DC signal associated with the centering operation includes a bias voltage for coinciding the optical center of the image sensor with the central optical axis of incident light.

8. The digital camera of claim 6, wherein in the centering operation, the image sensor is driven using a constant voltage direct current (DC) signal.

9. The digital camera of claim 6, wherein the digital signal processor further performs auto-focusing and auto-exposure in response to the first shutter signal.

10. A method of controlling a digital camera including a hand-tremble compensation element, the method comprising:
    detecting a first shutter signal corresponding to a start of a focusing operation;
    using a processor to perform a centering operation of the hand-tremble compensation element in response to the first shutter signal so that the optical center of the hand-tremble compensation element coincides with the central optical axis of incident light;
    detecting a second shutter signal corresponding to a start of a photographing operation;
    performing a compensation operation of the hand-tremble compensation element in response to the second shutter signal;
    calculating a target position for offsetting a detected camera shake; and
    controlling the hand-tremble compensation element to trace the target position,
    wherein the focusing operation is performed in response to the first shutter signal and after the centering operation is performed, while the compensation lens is held at a centered position, and the focusing operation is performed before the compensation operation is performed.

11. The method of claim 10, wherein the hand-tremble compensation element includes a compensation lens or an image sensor.

12. The method of claim 10, wherein a DC signal associated with the centering operation includes a bias voltage for causing the optical center of the hand-tremble compensation element to coincide with the central optical axis of incident light.

13. The method of claim 10, wherein in the performing of the centering operation, the hand-tremble compensation element is driven using a constant voltage direct current (DC) signal.

14. The method of claim 10, further comprising performing auto-focusing and auto-exposure in response to the first shutter signal.

* * * * *